United States Patent
Hong et al.

(10) Patent No.: US 10,688,464 B2
(45) Date of Patent: Jun. 23, 2020

(54) CORROSION INHIBITION IN HYDROTHERMAL PROCESSING

(71) Applicant: General Atomics, San Diego, CA (US)

(72) Inventors: Glenn Thomas Hong, Westborough, MA (US); Kevin William Downey, San Diego, CA (US)

(73) Assignee: GENERAL ATOMICS, San Diego, CA (US)

( * ) Notice: Subject to any disclaimer, the term of this patent is extended or adjusted under 35 U.S.C. 154(b) by 263 days.

(21) Appl. No.: 15/613,616

(22) Filed: Jun. 5, 2017

(65) Prior Publication Data
US 2018/0345241 A1 Dec. 6, 2018

(51) Int. Cl.
*C02F 1/02* (2006.01)
*C02F 1/72* (2006.01)
(Continued)

(52) U.S. Cl.
CPC .............. *B01J 19/02* (2013.01); *B01J 3/008* (2013.01); *C02F 1/025* (2013.01); *C02F 5/02* (2013.01);
(Continued)

(58) Field of Classification Search
CPC .... B01J 19/02; B01J 2219/0236; B01J 3/088; C02F 11/086; C02F 1/025; C02F 1/727;
(Continued)

(56) References Cited

U.S. PATENT DOCUMENTS 2,944,396 A 7/1960 Barton et al.
4,292,953 A 10/1981 Dickinson
(Continued)

FOREIGN PATENT DOCUMENTS

CA 2 642 295 1/2010
CN 101164912 A 4/2008
(Continued)

OTHER PUBLICATIONS

English language machine translation of JP2002-001088, No Date, 11 Pages.*
(Continued)

*Primary Examiner* — Pranav N Patel
(74) *Attorney, Agent, or Firm* — Knobbe, Martens, Olson & Bear, LLP (57) ABSTRACT

The disclosed technology relates to methods of inhibiting corrosion in reaction chambers configured for hydrothermal reaction of feeds containing a heteroatom. An embodiment of such a method comprises providing a feed stream comprising a phosphorus-containing material, an alkali metal compound, water, and a corrosion-inhibitor. The embodiment additionally includes introducing the feed stream and oxidant into a reactor chamber and oxidizing the phosphorus-containing material at an oxidation temperature greater than about 374° C. and an oxidation pressure exceeding about 25 bar, wherein the reactor chamber has inner surfaces comprising a material that corrodes when in contact with a phosphorus compound within the reactor. The embodiment additionally includes selectively reacting the corrosion-inhibitor with phosphorus within the reactor, thereby precipitating in the reactor chamber a phosphorus-containing solid inorganic compound. The embodiment further includes forming in the reactor chamber an alkali salt melt and carrying away from the reactor chamber a mixture comprising the solid phosphorus-containing inorganic compound and the alkali salt melt.

19 Claims, 3 Drawing Sheets

(51) Int. Cl.
*C02F 11/08* (2006.01)
*B01J 3/00* (2006.01)
*B01J 19/02* (2006.01)
*C10G 1/00* (2006.01)
*C23F 11/18* (2006.01)
*C23F 11/08* (2006.01)
*C02F 5/02* (2006.01)
*C02F 5/08* (2006.01)
*C02F 5/10* (2006.01)
C02F 5/06 (2006.01)

(52) U.S. Cl.
CPC .............. *C02F 5/08* (2013.01); *C02F 11/086* (2013.01); *C10G 1/004* (2013.01); *C23F 11/08* (2013.01); *C23F 11/18* (2013.01); B01J 2219/0236 (2013.01); C02F 5/06 (2013.01); C02F 5/083 (2013.01); C02F 5/10 (2013.01); C02F 2209/02 (2013.01); C02F 2209/03 (2013.01); C02F 2303/08 (2013.01)

(58) Field of Classification Search
CPC .. C02F 2209/02; C02F 2209/03; C10G 1/004; C23F 11/08; C23F 11/18
See application file for complete search history.

(56) References Cited

U.S. PATENT DOCUMENTS

| | | | |
|---|---|---|---|
| 4,338,199 | A | 7/1982 | Modell |
| 4,543,190 | A | 9/1985 | Modell |
| 5,106,513 | A | 4/1992 | Hong |
| 5,232,604 | A | 8/1993 | Swallow et al. |
| 5,501,799 | A | 3/1996 | Bond et al. |
| 5,527,471 | A | 6/1996 | Hong et al. |
| 5,545,337 | A | 8/1996 | Hong |
| 5,565,616 | A | 10/1996 | Li et al. |
| 5,755,974 | A * | 5/1998 | McBrayer, Jr. ....... C02F 11/086 210/739 |
| 5,785,868 | A | 7/1998 | Li et al. |
| 5,837,149 | A | 11/1998 | Ross et al. |
| 6,238,568 | B1 | 5/2001 | Hazlebeck |
| 6,264,844 | B1 * | 7/2001 | Modell ................ B01D 29/117 210/696 |
| 6,395,188 | B1 | 5/2002 | Burdeniuc et al. |
| 6,902,679 | B2 | 6/2005 | Burdeniuc et al. |
| 2008/0073292 | A1 * | 3/2008 | Stenmark ................ B01J 3/008 210/758 |

FOREIGN PATENT DOCUMENTS

| | | |
|---|---|---|
| EP | 1 090 886 A2 | 4/2001 |
| EP | 2 724 987 A1 | 4/2014 |
| EP | 2 857 361 A1 | 4/2015 |
| JP | H10-314769 | 12/1998 |
| JP | H11-138180 | 5/1999 |
| JP | 2002-001088 | 1/2002 |
| JP | 2002-273459 | 9/2002 |
| JP | 2003-236363 | 8/2003 |
| JP | 2003-236364 | 8/2003 |
| JP | 2003-236569 | 8/2003 |
| KR | 2009-0061188 | 6/2009 |
| WO | WO 2003/000602 A1 | 1/2003 |
| WO | WO 2014/007898 A1 | 1/2014 |

OTHER PUBLICATIONS

Voisin et al; J. of Supercritical Fluids 120 (2017) 18-31. (Year: 2017).*
Calzavara et al., "A new reactor concept for hydrothermal oxidation", The Journal of Supercritical Fluids, vol. 31, Issue 2, Oct. 2004, downloaded from www.sciencedirect.com/science/article/pii/S089684460300264X on Mar. 11, 2016 in 2 pages.
Example Compounds Treated from Client Website in 1 page downloaded from http://www.ga.com/hazardous-waste-destruction on Feb. 26, 2016.
Hong et al., "The NaCL—Na2SO4—H2O System in Supercritical Water Oxidation", Physical Chemistry of Aqueous Systems: Meeting the Needs of Industry, 1994, pp. 565-572.
Hultman et al., "Phosphorus Recovery from Sludge in Sweden—Possibilities to Meet Proposed Goals in an Efficient, Sustainable and Economical Way", Dep. Of Land and Water Resources Engineering, pp. 19-28.
"Industrial Supercritical Water Oxidation", General Atomics Electromagnetics, 2 page datasheet.
Marrone et al., "Chapter 13: Supercritical Water Oxidation", Dec. 29, 2006 in 71 pages.
Sarrade et al., "Supercritical water oxidation: from reactors concept to hydrothermal oxidation of nuclear wastes", in 6 pages.
Stendahl et al., "Phosphate recovery from sewage sludge in combination with supercritical water oxidation", Water Science and Technology vol. 48, No. 1, pp. 185-191, 2003.
Veriansyah et al., "Supercritical water oxidation for the destruction of toxic organic wastewaters: A review", Journal of Environmental Sciences 19(2007) 513-522.

* cited by examiner

CORROSION INHIBITION IN HYDROTHERMAL PROCESSING

BACKGROUND

Field

The disclosed technology generally relates to corrosion inhibition in hydrothermal processing, and more particularly to corrosion inhibition within reaction chambers configured for hydrothermal oxidation of corrosive materials such as heteroatom-containing organic waste.

Description of the Related Art

Increasing public health concerns continue to drive new legislation and regulation standards aimed at providing a cleaner and safer environment. In particular, treatment of environmentally hazardous organic wastes is an ever-growing environmental challenge, in part due to increasing environmental regulation standards. For example, many EPA (Environmental Protection Agency) goals demand destruction of the organic waste to levels up to 99.9999%. However, treatment processes that are capable of meeting the increasing regulation standards are often difficult to implement and/or are costly. Conventional technologies for treating organic and toxic wastes include adsorption, incineration, and land-based disposal technologies, among other technologies. Each of the conventional technologies has its pros and cons. For example, conventional land-based disposal technologies, while they may generate less greenhouse gases and be relatively cheaper, can result in the contamination of surrounding soil and groundwater. As a result, there is a growing public concern and regulatory response that increasingly restrict or prohibit land-based disposal technologies. In addition, while some conventional disposal technologies may be environmentally acceptable, they may not be economically feasible. For example, many technologies using conventional thermal energy, e.g., incineration, are expensive to implement because they involve heating the organic waste to very high temperatures (e.g., temperatures exceeding 900° C., and often with excess air of 100% to 200%). They also involve the use of complex pollution abatement systems to manage the products of incomplete combustion and other contaminants that result. In particular, with aqueous wastes, the energy required to bring the water component of the waste to the incineration temperature can be substantial. While for aqueous wastes having relatively high organic content, e.g., >25%, the heat used to generate the high temperature can be generated from wastes themselves, for wastes having lower organic content, the supplemental fuel to satisfy the energy balance can render the process cost-prohibitive.

As an alternative to incineration, wet air oxidation (WAO) has been proposed to treat organic-containing wastes. WAO of organic-containing waste is typically conducted in a temperature range of 150° C. to 350° C. and a pressure range of 2 MPa to 20 MPa. However, a number of compounds, e.g., m-xylene and acetic acid are resistant to oxidation at these conditions. Additionally, WAO often does not achieve the 99.9% destruction efficiencies as may be desirable under government regulations. To address these concerns, WAO processes have been extended to higher temperatures and pressures. For example, U.S. Pat. No. 2,944,396 discloses the addition of a second oxidation stage after a wet oxidation reactor, in which unoxidized volatile combustibles that accumulate in the vapor phase of the first stage wet oxidation reactor are oxidized in a second oxidation stage, which is operated at temperatures above the critical temperature of water at about 374° C.

A substance that is above the temperature and pressure of its thermodynamic critical point, i.e., the limit of vapor-liquid equilibrium, is referred to as a supercritical fluid. Above this critical point, phase transformation may not occur, and the substance is considered neither a liquid nor a gas, but a homogeneous, supercritical fluid. U.S. Pat. No. 4,292,953 discloses a modified wet oxidation process for power generation from coal and other fuels in which, as heat is liberated by combustion, the reaction mixture exceeds the critical temperature of water, with operating pressures of about 69 bar (1000 psi) to about 690 bar (10,000 psi) spanning both the sub- and supercritical water pressure ranges. U.S. Pat. No. 4,338,199 discloses a wet oxidation process which has come to be known as supercritical water oxidation (SCWO) because oxidation occurs essentially entirely at conditions supercritical in temperature (>374° C.) and pressure (>about 3200 psi or 220 bar) for water. SCWO at 500°-650° C. and 250 bar has been shown to give rapid and near complete oxidation of organic compounds. A related process known as supercritical temperature water oxidation (STWO) can provide similar oxidation effectiveness for certain feedstocks but at lower pressure. This process has been described in U.S. Pat. No. 5,106,513 utilizes temperatures in the range of 600° C. and pressures between 25 and 220 bar. These various oxidation processes which feature high water content will hereinafter be referred to collectively as "hydrothermal oxidation" ("HTO") if carried out at a temperature in the range of about 374° C. to about 800° C. and pressures above about 25 bar. Characteristics of the HTO process will be described below for the specific case of SCWO, though other HTO environments will have much in common.

The oxidation occurring in the SCWO process is comparable to incineration in that carbon and hydrogen in the organic waste react to form conventional combustion products, primarily $CO_2$ and $H_2O$. However, treating chlorine-, sulfur- and/or phosphorus-containing organic wastes by the SCWO process can result in the formation of corrosive agents. Halogenated hydrocarbons may react to form strong acids, for example, chlorinated hydrocarbons (CHCs) may react to form HCl. In contrast to normal combustion, which forms $SO_2$, the final product of sulfur oxidation in SCWO includes the sulfate moiety, $SO_4^{-2}$. Similarly, the SCWO product of phosphorus oxidation includes the orthophosphate ($PO_4^{-3}$) or metaphosphate ($PO_3^{-}$) moiety. It has been recognized that these moieties may result in the formation of strong acids, leading to acid corrosion problems for the processing equipment. Various methods for managing the effects of corrosion in SCWO have been surveyed by Marrone and Hong ("Corrosion Control Methods in Supercritical Water Oxidation and Gasification Processes", P. A. Marrone and G. T. Hong, J. Supercritical Fluids, 51(2) 83-103, 2009.) Approaches to neutralizing corrosion-causing acids by forming salts have been disclosed, such as adding alkaline materials to neutralize the acids and thereby reduce acid corrosion. For example, the addition of sodium hydroxide during the SCWO processing of chlorine-, sulfur- and phosphorus-containing organic wastes leads to the formation of sodium salts, e.g., NaCl, $Na_2SO_4$, $NaPO_3$, etc., which are typically much less corrosive than the acids that would otherwise form.

However, while reducing corrosion, the formation of salts in the reactor creates serious processing problems. Salts are generally insoluble at SCWO reactor conditions, which can lead to the formation of precipitated salts that accumulate in the reactor and associated piping, which in turn can cause plugging. The problem is well recognized and various methods for handling salt precipitation in SCWO have been surveyed by Marrone, et al. ("Salt Precipitation and Scale Control in Supercritical Water Oxidation—Part B: Commercial/Full-scale Applications," P. A. Marrone, M. Hodes, K. A. Smith and J. W. Tester, J. Supercritical Fluids, 29, 289-312, 2004).

In addition to the problem of reactor plugging, the addition of alkali does not entirely eliminate the corrosion problem because the resulting salts remain somewhat corrosive. Therefore, even when alkali is added, the inner surfaces of SCWO reactors are typically fabricated of corrosion-resistant materials such as nickel-based alloys, titanium, ceramics, or even precious metals (see e.g. U.S. Pat. Nos. 5,527,471 and 5,545,337). Titanium has proven to be a particularly useful material for fabricating SCWO reactor liners and internal parts. It is much less expensive than precious metals, less brittle than ceramics, produces only the innocuous corrosion product titanium dioxide, and is more resistant than many materials to corrosive attack from halide and sulfate salts. Titanium, however, is vulnerable to attack by phosphorus in both acid and salt forms, and is often used as a sacrificial part in such applications.

Japanese patent JP2002001088(A) discloses that multivalent cations such as iron, aluminum, calcium, magnesium, and/or barium are superior to sodium in preventing phosphorus corrosion. Although phosphorus corrosion may be reduced or eliminated by using these cations instead of sodium, they form solids that cause reactor plugging.

Thus, there remains a significant need for methods of reducing corrosion while simultaneously avoiding salt plugging in hydrothermal systems during the treatment of feed materials such as organic wastes.

SUMMARY

It has now been found that corrosion in hydrothermal systems during the hydrothermal treatment of materials, e.g., organic wastes, can be mitigated while simultaneously avoiding salt plugging by adding a selective corrosion inhibitor in conjunction with forming a salt melt within the reactor. Corrosion and plugging can be reduced or eliminated by properly choosing the type and amount of corrosion inhibitor and melt-forming constituents.

In one aspect, a method of inhibiting corrosion in a hydrothermal system during hydrothermal treatment of a feed material includes providing a hydrothermal reactor having inner surfaces, e.g., chamber walls, that are susceptible to corrosion at hydrothermal operating conditions, the hydrothermal operating conditions comprising a temperature greater than about 374° C. and a pressure greater than about 25 bar. The method further includes introducing to the hydrothermal reactor a feed stream comprising the feed material, the feed material comprising a corrosive agent that is corrosive to the inner surfaces of the hydrothermal reactor at the hydrothermal operating conditions. The method further includes introducing to the hydrothermal reactor a corrosion inhibitor that selectively reacts at least partially with the corrosive agent to form an insoluble inorganic compound at the hydrothermal operation conditions. The method further includes providing the constituents of a salt mixture to the hydrothermal reactor so as to form a salt melt at the hydrothermal operation condition, the salt melt having the insoluble inorganic compound dispersed therein. The method also includes operating the hydrothermal reactor at the hydrothermal operating condition for a period of time or a residence time effective to treat the feed material. The method also includes removing at least a portion of the salt melt from the hydrothermal reactor.

In another aspect, a method of oxidizing a feed material comprises providing a feed stream comprising water, a corrosion inhibitor, a phosphorus compound, and salt composition that forms an alkali metal salt melt at a temperature greater than about 374° C. and a pressure exceeding about 25 bar. The method additionally includes introducing the feed stream and an oxidant into a reactor chamber and oxidizing the feed stream at the temperature and the pressure, wherein the reactor chamber has an inner surface comprising a material which is susceptible to corrosion when in contact with a phosphorus-containing corrosive agent formed from the phosphorus compound in the reactor chamber. The method additionally includes selectively reacting the corrosion-inhibitor with the phosphorus-containing corrosive agent, thereby precipitating in the reactor chamber a solid phosphorus-containing inorganic compound. The method further includes forming in the reactor chamber an alkali salt melt and flowing away from the reactor chamber a mixture comprising the solid phosphorus-containing inorganic compound and the alkali salt melt.

These and other embodiments are described in greater detail below.

DETAILED DESCRIPTION

In the following, various embodiments directed to inhibiting corrosion in hydrothermal oxidation (HTO) processes are described. As described herein, an HTO process refers to an aqueous oxidation process in which the liquid feed to the reactor comprises at least about 50 weight % water on the basis of the total weight of the liquid feed, and carried out at a temperature in the range of about 374° C. to about 800° C. and at a pressure exceeding about 25 bar. Such combinations of water, temperature and pressure are referred to herein as hydrothermal operating conditions. While various embodiments described herein are directed to inhibiting corrosion in HTO processes, embodiments are not so limited, and the concepts may be applied to a variety of hydrothermal systems including non-oxidative hydrothermal processes, such as hydrothermal gasification.

As described herein, a heteroatom refers to an element other than C, H, O and N that may or may not be bonded to C, H, O and/or N atoms of the feed molecules. In various embodiments, a heteroatom may be Cl, S, F or P. A feed may comprise one or more heteroatoms, e.g., in the form of an inorganic compound or an organic compound, such as an organosulfur compound, an organophosphorus compound, an organochlorine compound, an organofluorine compound or a combination thereof. Inorganic compounds may include salts such as NaCl, $Na_2SO_4$ and $NH_4Cl$, acids such as HCl and $H_2SO_4$, and bases such as NaOH and $Na_2CO_3$.

As described above, inhibiting corrosion of reactors during aqueous oxidation reactions of feeds that include heteroatoms can pose competing challenges. On the one hand, formation of corrosive agents such as corrosion-causing acids formed by some of the heteroatoms (e.g., Cl, S, F and/or P) in the feed can be suppressed by reacting with alkalis that form salts that include the heteroatoms. However, without effectively transporting the resulting salts through the reactor and removing them, the process can become unsustainable due to accumulation of the salts within the reactor.

Furthermore, of particular importance for the various embodiments, the salt $NaPO_3$ is still highly corrosive to titanium.

Advantageously, various embodiments are described in which corrosive agents are effectively reduced by forming salts of their corrosion-causing elements while simultaneously suppressing accumulation of these and other salts in the reactor. For example, in embodiments, corrosion-causing acids formed from the heteroatoms released by or contained in the feed (such as chlorine and/or sulfur) are suppressed by reacting the acids with an alkali to form an insoluble inorganic compound by, for example, precipitating NaCl and $Na_2SO_4$. In an embodiment, an additional, selective corrosion inhibitor comprises an alkaline earth metal such as magnesium (Mg) or calcium (Ca) to preferentially bind the phosphorus constituent and form an insoluble inorganic compound, e.g. $Ca_3(PO_4)_2$ or $Mg_3(PO_4)_2$. The proportions of NaCl and $Na_2SO_4$ are controlled so as to form a melt at the hydrothermal operating condition. The melting point of the salt melt can be controlled by adding salts, acids, or bases containing the appropriate cations and/or anions to the reactor (e.g., in or with the feed stream and/or separately). If the feed material already contains sufficient corrosion inhibitor and/or melt-forming constituents to form a melt, further adjustment of feed composition is not required. Those skilled in the art can use routine experimentation guided by the detailed teachings provided herein to select the types and amounts of corrosion inhibitor and melt-forming agents to form a suitable salt melt at the hydrothermal operating conditions used for the hydrothermal treatment of a particular feed material.

Various surfaces of SCWO reactors are formed of corrosion-resistant materials, such as nickel-based alloys, titanium, ceramics, or even precious metals. See, e.g. U.S. Pat. Nos. 5,527,471 and 5,545,337. As noted above, titanium has proven to be a particularly useful material for fabricating the inner surfaces of hydrothermal systems such as SCWO reactor liners and internal parts. Embodiments disclosed herein are particularly advantageous for suppressing corrosion in reactors that contain titanium-based parts.

Figure 1:
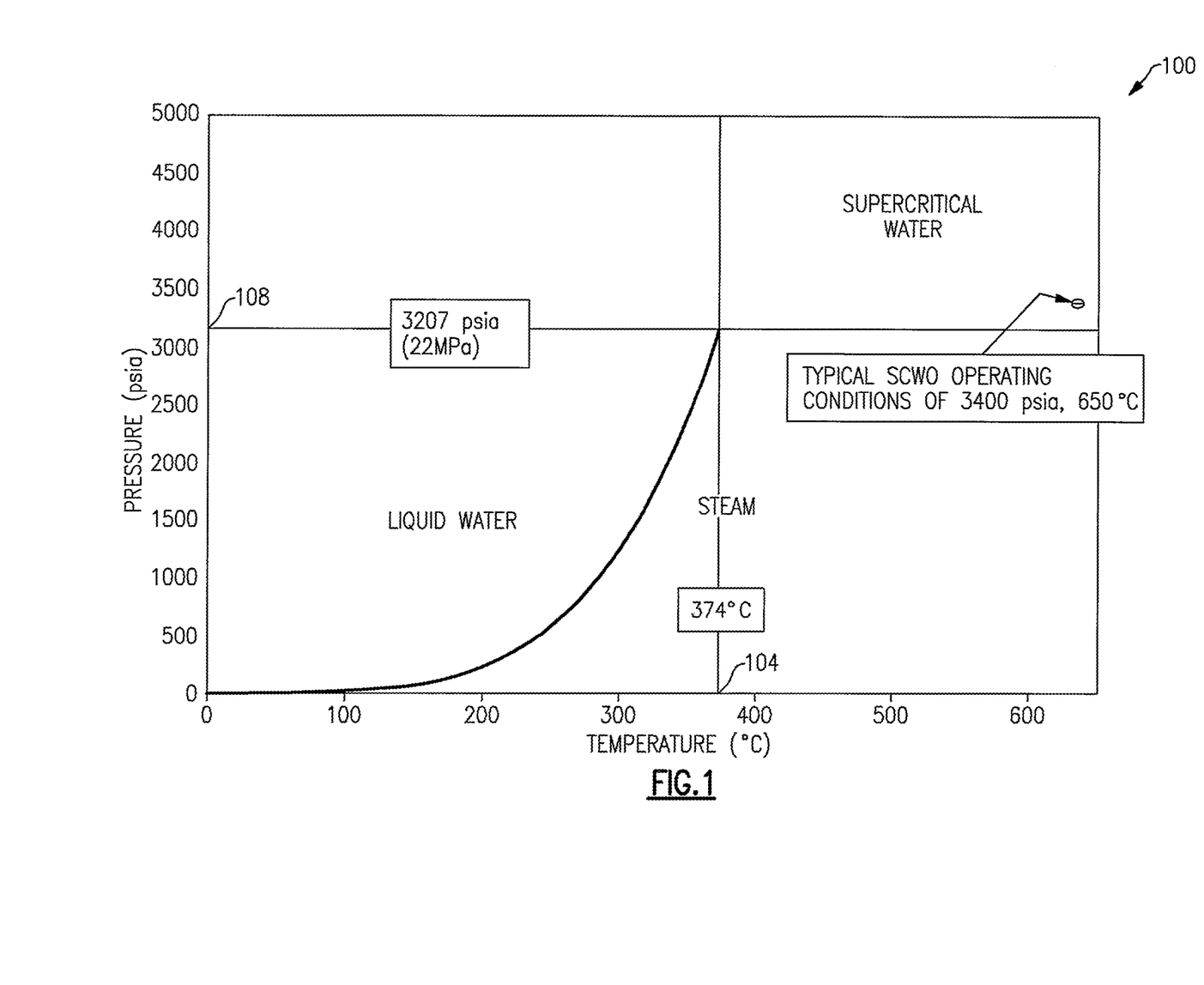
FIG. 1 is a pressure-temperature (P-T) phase diagram of water.

FIG. 1 is a pressure-temperature (P-T) phase diagram 100 of water showing the vapor pressure curve. Pure water has a critical temperature 104 of about 374° C. and a critical pressure 108 of about 221 bar (3206 psia). The relatively high critical temperature, combined with the unique characteristics of the water molecule's structure, leads to some useful effects on behavior of water as a solvent above its critical point. Water is a polar molecule which, under ambient conditions, exhibits a high degree of hydrogen bonding. As a result, liquid water can dissolve other polar substances such as inorganic salts relatively easily, while not readily dissolving nonpolar substances such as hydrocarbons. As temperature and pressure are increased along the vapor pressure curve from ambient conditions up to the critical point, however, the density of water decreases by over an order of magnitude, and the water molecules become sufficiently separated from each other such that their dipole-dipole interactions are greatly diminished. With the loss of hydrogen bonding and weakened interactions between molecules, water in its supercritical state starts to behave more like a nonpolar solvent rather than a polar solvent. As a result, nonpolar compounds such as most hydrocarbons and gases (e.g., $O_2$, $N_2$) become highly soluble in supercritical water, and polar compounds such as inorganic salts become insoluble in supercritical water—a reversal of water's behavior compared to its behavior under ambient conditions. As shown in FIG. 1, a typical SCWO reactor condition is at a pressure of about 235 bar (3400 psi) and a temperature of about 650° C. The combination of high temperature and its ability to bring organic species and oxygen together in a single, homogeneous, dense phase provides favorable conditions for use in the destruction of organic compounds. In the following, it will be appreciated that, while FIG. 1 illustrates the critical temperature 104 and the critical pressure 108 for pure water, when impurities are added (e.g., material such as organic waste), the critical temperature can increase or decrease from that of pure water, and the critical pressure can increase or decrease from that of pure water.

Figure 2A:
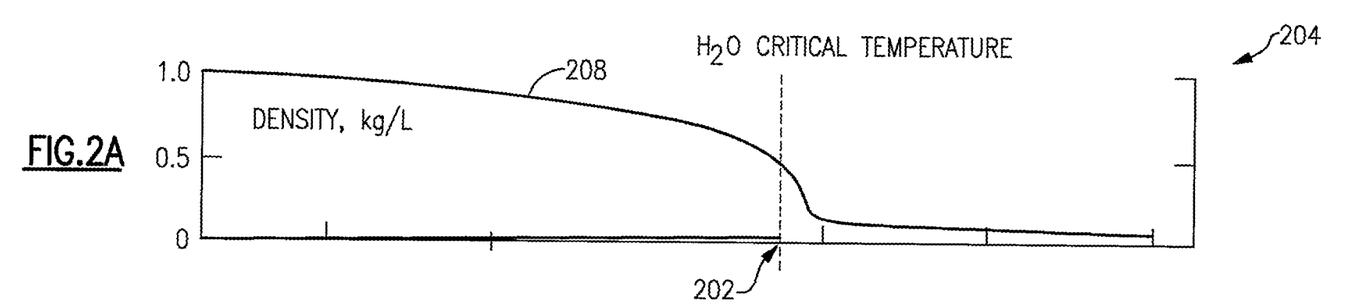
FIG. 2A is a graph showing the variation of density of water as temperature is varied through the supercritical temperature at a pressure of 25 MPa (250 bar).
Figure 2B:
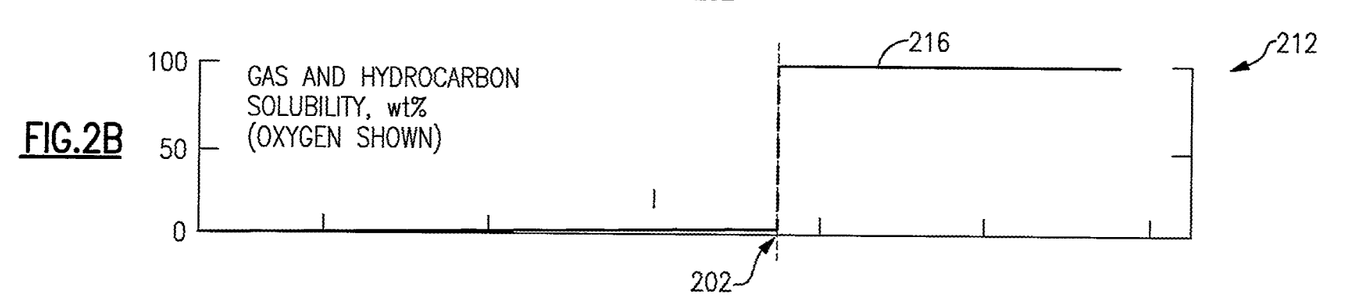
FIG. 2B is a schematic graph showing the variation of solubility of oxygen and hydrocarbon in water as temperature is varied through the supercritical temperature at a pressure of 25 MPa (250 bar).
Figure 2C:
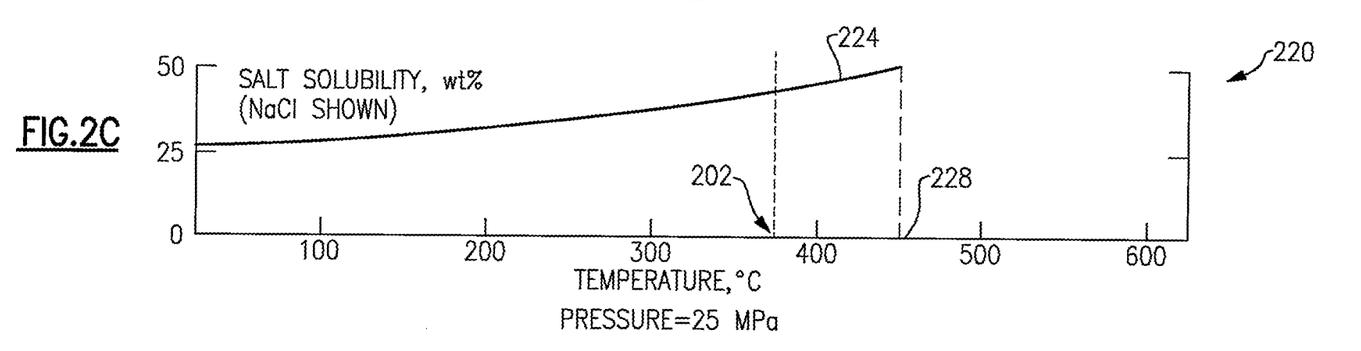
FIG. 2C is a schematic graph showing the variation of solubility of salts in water as temperature is varied through the supercritical temperature at a pressure of 25 MPa (250 bar).

FIGS. 2A to 2C further illustrate some of the properties of supercritical water. FIG. 2A is a schematic graph 204 showing the variation of density 208 of water as a function of temperature at an example pressure of 25 MPa (250 bar), as the temperature of water is varied through the supercritical temperature 202 at 374° C. As temperature is increased from ambient conditions through the critical point at 25 MPa, the density of water decreases rapidly around the supercritical temperature 202, and the water molecules become sufficiently separated from each other such that their dipole-dipole interactions are greatly diminished.

FIG. 2B is a schematic graph 212 showing the variation of solubility 216 of oxygen and hydrocarbons in water as a function of temperature at an example pressure of 25 MPa as the temperature is varied through the supercritical temperature 202. As discussed elsewhere herein, with the loss of hydrogen bonding and weakened interactions between molecules, water in its supercritical state starts to behave more like a nonpolar solvent such that most hydrocarbons and gases (e.g., $O_2$, $N_2$) become highly soluble in supercritical water.

FIG. 2C is a schematic graph 220 showing the variation of solubility 224 of salts in water as a function of temperature at an example pressure of 25 MPa as the temperature is varied through the supercritical temperature. In particular, the solubility 224 is that of NaCl, for illustration purposes. A consequence of water's behavior in the supercritical state as being more like a nonpolar solvent is that inorganic salts become less soluble or insoluble in supercritical water, which is a reversal of water's behavior under ambient conditions. As illustrated in reference to FIG. 2C, the solubility of NaCl gradually increases through and past pure water's supercritical temperature 202. However, for the illustrated condition, the solubility of NaCl can drop rapidly as the temperature crosses a phase boundary temperature 228, beyond which solid and/or liquid NaCl becomes more stable and precipitates from the mixture.

Figure 3:
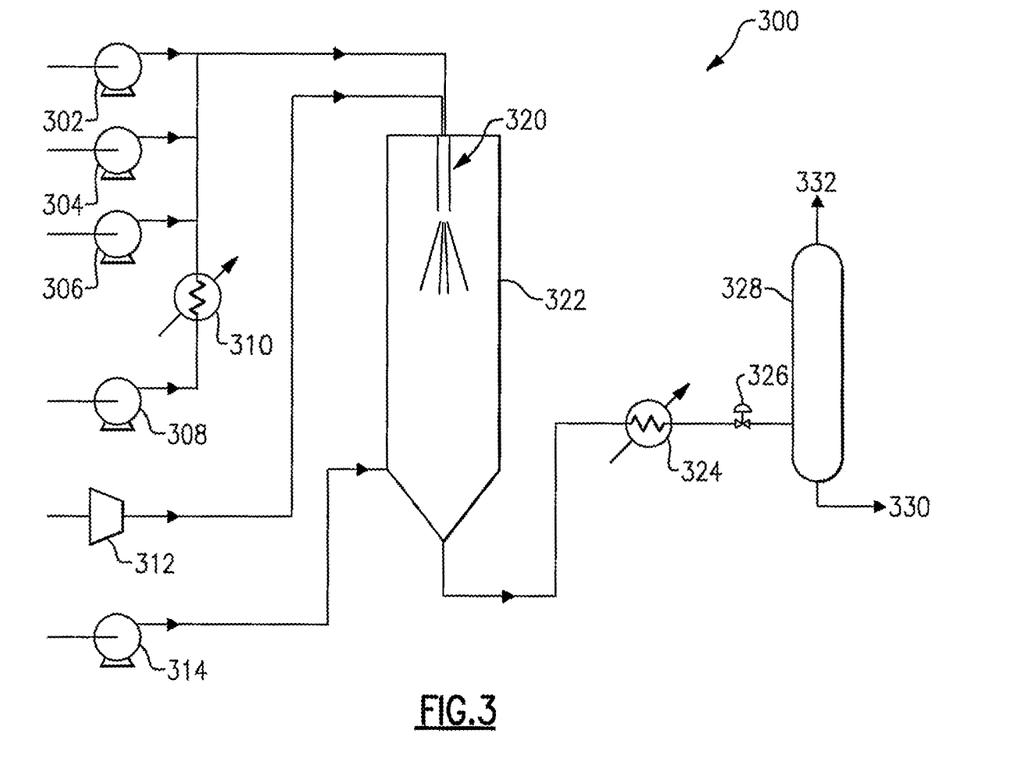
FIG. 3 is a schematic illustration of a supercritical water oxidation (SCWO) treatment system.

FIG. 3 provides a representative flow diagram for a continuous-flow SCWO system 300 for treating organic-containing waste, according to embodiments. In the SCWO system 300, organic-containing waste is pressurized in a first pump 302 and fed through a feed nozzle 320 into a SCWO reactor 322. Depending upon the heating value of the organic-containing waste, it can optionally be enriched with fuel pressurized through a second pump 304 or diluted with water pressurized through a third pump 308. The pressurized water may be preheated in preheater 310, which may be any sort of industrial heater such as a gas-fired or electric heater. A regenerative heat exchanger may also be utilized, although for plant startup a net input of heat is required. In addition to the above streams, an additive stream may be supplied to the reactor 322 through a fourth pump 306. The use of additives is application-specific and may include for example an alkali such as sodium hydroxide to neutralize acids formed in the SCWO reactor 322, and/or other additives to aid in the transport of salts through the SCWO reactor 322, and/or additives to accelerate the SCWO reaction. While a single additive pump is shown in FIG. 3, additional additive pumps may be used as necessary. The oxidation reaction occurring in the SCWO reactor 322 uses a source of oxygen, for example high-pressure compressed air supplied through a compressor 312. It will be appreciated that sources of oxidant other than high pressure air may be supplied to the SCWO reactor 322, for example, pure oxygen from a compressed gas or cryogenic source, enriched air from a pressure swing absorption unit, hydrogen peroxide solution, or nitric acid solution, to name a few.

While FIG. 3 illustrates various streams being separately pressurized and fed to the SCWO reactor 322 through nozzle 320, other arrangements may be used depending upon the application. For example, in some applications, it may be preferable to introduce the fuel, water, or additives to a single feed tank that supplies the feed pump 302. Alternatively, the fuel, water, or additives may be supplied at low pressure from individual tanks but mixed on-line upstream of the high-pressure feed pump 302. Likewise, those skilled in the art will appreciate that corrosion inhibitors may be added at any convenient location, for example, in the feed tank, at the inlet of the high-pressure feed pump, or directly into the reactor. The various high-pressure streams are injected through feed nozzle 320 into the SCWO reactor 322, and the fluid jet emanating from the nozzle tip leads to back-mixing of the hot fluid already in the reactor with the incoming cold feed, propagating the oxidation reaction.

Within the reactor organic compounds are oxidized to form, among other products, $CO_2$ and water, in a residence time of 10-15 seconds. Advantageously, in many SCWO processes, despite the short residence time, little or no CO or other gaseous hydrocarbons characteristic of incomplete or inefficient combustion are produced. Also unlike typical combustion processes, little or no $NO_x$ compounds or $SO_2$ are produced. Instead, nitrogen that may be contained in organic feed compounds is converted primarily to $N_2$, with possibly smaller amounts of $N_2O$. When present as part of the waste feed, heteroatoms (e.g., Cl, S, F and/or P) may be in the form of or converted to their corresponding mineral acids (e.g. HCl, $H_2SO_4$, HF, $H_3PO_4$) in the SCWO process. The mineral acids can aggressively corrode internal parts of the SCWO reactor, including the feed nozzle 320, thermowells for monitoring the internal reactor temperature (not shown), and various portions of the inner walls or wall liner (not shown) of the SCWO reactor 322. If cations such as sodium are present in the feed, or have been introduced as an additive such as sodium hydroxide, corrosion is mitigated by the formation of salts by reaction with the acids, e.g. NaCl, $Na_2SO_4$, NaF, and/or $Na_3PO_3$.

Once the reaction in the SCWO reactor 322 has achieved the desired destruction and removal efficiency, the reactor stream may be cooled. The cooling of the reactor stream may be performed in two steps. The first step may include introduction of high-pressure, ambient-temperature quench water through a fifth pump 314 to produce a quench zone in a bottom portion of the SCWO reactor 322. The quench water brings the combined stream to a subcritical temperature where salts are dissolved and prevented from plugging the reactor outlet. The subcritical temperature reduces gas solubility, and leads to formation of an entrained gas phase primarily comprising nitrogen, excess oxygen, and carbon dioxide. The reactor effluent is subsequently further cooled, e.g., in a cooler 324, depressurized through letdown valve 326 and separated into a gas effluent stream 332 and a liquid/solid effluent stream 330 in separator 328. Advantageously, the SCWO system 300 is enclosed up to the point of final discharge to the environment, facilitating post-processing and monitoring prior to release. This feature can be useful, e.g., when treating toxic or radioactive wastes. In some implementations, excess heat of reaction can be recovered for use within the process, or for external purposes, such that the SCWO process can be self-sustaining for organic concentrations exceeding certain limits, e.g., >1%. SCWO processing is not limited to disposal of organic compounds and complex organic wastes. Inorganic waste constituents, such as nitrates or ammonia, can be destroyed with similar efficiency by the addition of suitable reducing or oxidizing agents.

Those skilled in the art will appreciate that the methods described herein are applicable to reactor designs other than those shown in FIG. 3, for example elongated straight pipe reactors, elongated coiled pipe reactors, transpiring wall reactors, and hydrothermal flame reactors. Reactor orientation may vary, including both horizontal and vertical.

As described elsewhere and above, the feed may include heteroatoms such as Cl, S, F and/or P, in organic or inorganic form, that may result in formation of corresponding mineral acids such as HCl, $H_2SO_4$, HF, $H_3PO_4$, that can aggressively corrode inner surfaces of the SCWO reactor. To reduce or minimize corrosion, a base can be added to the feed or the reactor, such that acids formed during the oxidation reaction are neutralized to form salts. These salts can adhere to and accumulate on the reactor walls and other surfaces within the reactor, and can inhibit and ultimately block the process flow unless they are removed or their accumulation is controlled. To address this issue, methods for controlling salt accumulation according to embodiments include forming a salt mixture composition to result in the formation of a salt melt. Such salt melts typically include cations that form salts with melting temperatures not too far above the SCWO reactor operating temperature of ~650° C. Salts of sodium and potassium that possess melting temperatures up to about 900° C. have been found to be suitable melt-formers. Such a melt can flow through the SCWO reactor until it reaches the quench zone, where the melt is dissolved into the cooler fluid.

Controlling the salt composition can be accomplished in various ways. In the case described above, the feed material contains anionic elements, i.e., Cl, S, F and/or P, and alkali metals such as sodium and/or potassium may be added to form a salt melt. It is generally most convenient to form a salt mixture to enable the formation of a salt melt. In a salt mixture, eutectic-type interactions occur yielding a melting temperature lower than that of any of the pure constituent salts. For example, if a feed contains or only contains anionic element(s) of a salt, e.g., Cl, adding a mixture of sodium- and potassium-containing melt-forming agents would yield a low-melting salt mixture. In another example, if a feed contains or only contains cationic element(s) of a salt, e.g., Na, a mixture of hydrochloric and sulfuric acids could be added to obtain a low-melting salt mixture. In another example, if a feed material already contained a salt, e.g., NaCl, another salt, e.g., $Na_2SO_4$ salt could be added to attain a low-melting salt mixture. In yet another example, if a feed material contains P as the only heteroatom, both NaCl and $Na_2SO_4$ salts could be added to produce a low-melting salt mixture. In the first three examples above, the presence of phosphorus will tend to increase the mixture complexity and can further lower the mixture melting point.

To create the salt mixtures, the relative amounts of each constituent can be varied to obtain a target melt temperature. The suitable melt temperature can vary depending upon the selected operating temperature and pressure of the SCWO reactor. The high partial pressure of water also aids in depressing the salt mixture melting point. As the partial pressure of water varies with the selected oxidant, e.g., air vs oxygen, the selected oxidant can also affect the targeted melt temperature. The lowest attainable melt temperature can occur in the vicinity of the eutectic point of the water-free salt mixture, with some offset due to the effects of water. The salt melt will generally have a small content of water, on the order of 10 wt %.

While use of a neutralizing alkali greatly reduces acid corrosion, it is not eliminated. Therefore, reactors typically employ corrosion-resistant materials for fabricating reactor components that contact the process fluid, e.g., feed nozzles, thermowells, and reactor liners. For example, nickel-based alloys C-276 and 625, and/or titanium can be employed. Titanium in particular may be suitable in many applications as its major corrosion product, titanium dioxide ($TiO_2$), is nontoxic, unlike the corrosion products of nickel and chromium released during corrosion of nickel-based alloys. Titanium has outstanding resistance to corrosion by halides and sulfate salts in a SCWO environment. It is, however, vulnerable to attack by phosphate salts. Without being bound to any theory, it is believed that corrosive attack on titanium may involve, among other possible reaction paths, the reaction represented by Equation [1] as:

$$9NaPO_3 + 5TiO_2 \rightarrow Na_5Ti_5P_7O_{30} + Na_4P_2O_7 \quad [1]$$

See "Solubility of Titanium Dioxide in Phosphate-Halide Melts", V. P. Kochergin and M. S. Ulanova, Russ. J. Inorg. Chem. 14:1337-1339, 1969, the disclosure of which is hereby incorporated by reference in its entirety. In accord with this reaction, sodium metaphosphate salt ($NaPO_3$) can strip the passivated layer of $TiO_2$ from the metal surface, leaving the reactive metal underneath vulnerable to oxidative attack. $TiO_2$ quickly reforms on the surface by reaction with water, but is then stripped away again by new metaphosphate salt present in the salt melt flowing down the reactor liner wall.

It will be appreciated that, despite being described herein in the context of inhibiting corrosion of reactors having Ti-containing surfaces, various embodiments described herein are applicable to reactors having other metals. For example, the method may also be used to mitigate phosphorus corrosion of nickel-based alloys.

The corrosion reaction represented by Equation [1] might be avoided if a cation that bound phosphorus more strongly than sodium could be used for acid neutralization in the SCWO reactor. For example, Japanese patent JP2002001088(A) discloses that multivalent cations such as iron, aluminum, calcium, magnesium, and/or barium are superior to sodium in preventing phosphorus corrosion. However, although phosphorus corrosion may be reduced or eliminated by using these cations instead of sodium, they form high-melting solids that normally do not form salt melts under hydrothermal operating conditions and hence do not provide a solution to the problem of reactor plugging.

To address these and other observations, the inventors have discovered various embodiments in which corrosion caused by phosphorus may be reduced or prevented while retaining the presence of a flowable melt in part by adding corrosion inhibitors into the feed stream. The discovery is based in part on consideration of relative stabilities of possible species that may be formed by the corrosion inhibitors, based on thermochemical equilibrium calculations at SCWO reactor conditions. Examples of corrosion inhibitors include alkaline earth metals, particularly Ca and Mg. For calcium, the order of thermodynamic stability of various species, in decreasing order of stability, is as follows:

$$Ca_5(PO_4)_3F > Ca_3(PO_4)_2 > Ca_5(PO_4)_3OH >$$
$$CaSO_4 > CaF_2 > CaCO_3 > CaCl_2 > Na\ salts$$

For magnesium, the order of thermodynamic stability of possible species, in decreasing order of stability, has been found is as follows:

$$Mg_3(PO_4)_2, > MgSO_4, > MgF_2, > MgCO_3, >$$
$$MgCl_2 > Na\ salts$$

The inventors have discovered that Ca and Mg may be used to selectively bind phosphorus (along with some fluoride, if present, in the case of calcium), not only over sodium salts but also over the other anions that may be present in the hydrothermal system. As a result, it is possible to add only enough Ca or Mg additive to bind the phosphorus, while retaining sodium and its associated melts for the other anions. In other words, the phosphorus is selectively reacted with calcium and/or magnesium to prevent the formation of the highly corrosive $NaPO_3$ in Equation [1]. Thus, calcium and/or magnesium phosphate solids that have relatively low reactivity with titanium can be formed and transported through the reactor along with the melt formed by the sodium salts.

The corrosion inhibitors, e.g., calcium and/or magnesium additives, may be added to the SCWO reactor by suitable means, for example using additive pump 306 in FIG. 3, or an additional pump (not shown) if pump 306 is already in use. In some applications, corrosion inhibitors may be introduced into a feed tank that supplies the feed pump 302.

According to embodiments, the quantity of corrosion inhibitor can be adjusted based on the amount of phosphorus that may be present in the feed, e.g., to a quantity that can stoichiometrically bind the phosphorus. However, the quantity of corrosion inhibitor can be adjusted upwards or downwards, depending on circumstances. For example, if some of the corrosion inhibitor is found to bind with anions other than phosphorus, a super-stoichiometric quantity of corrosion inhibitor may be used. Alternatively, if the quantity of corrosion inhibitor is found to be interfering with flow of the melt, a sub-stoichiometric or partially neutralizing quantity of corrosion inhibitor may be used. In this latter case corrosion inhibition may be less complete, but still of significant advantage. According to embodiments, the amount of corrosion inhibitor added can be adjusted on the basis of a ratio between the stoichiometric molar concentration of the inhibitor element (e.g., Ca or Mg) and the stoichiometric molar concentration of the corrosive element (e.g., P) in the resulting inorganic compound. For example, when the corrosion-inhibitor comprises calcium, and the resulting inorganic compound is calcium phosphate ($Ca_3(PO_4)_2$), the ratio of stoichiometric molar concentrations between Ca and P would be 3:2. According to embodiments, the ratio may be adjusted to be within +/−100%, +/−50% or +/−30% of the stoichiometric ratio.

The corrosion inhibitors may be introduced in any convenient and practical form. Examples include calcium hydroxide, milk of lime, magnesium hydroxide, magnesium carbonate, milk of magnesia, calcium chloride solution, calcium acetate solution, calcium EDTA solution, calcium carbonate suspension, calcium sulfate suspension, etc. It is also possible to combine the corrosion inhibitor with a reaction accelerant as described in U.S. Pat. No. 5,232,604, the disclosure of which is hereby incorporated by reference in its entirety. For this purpose, the corrosion inhibitor may be added as calcium or magnesium nitrate or nitrite. Use of a reaction accelerant may expedite release of phosphorus from an initial organic form and improve the selective binding of phosphorus with the corrosion inhibitor.

In the following, further details of a method of inhibiting corrosion in a hydrothermal reactor, e.g., the reactor 322 (FIG. 3), according to embodiments, is described.

The method comprises providing a hydrothermal reactor having an inner surface that is susceptible to corrosion at a hydrothermal operating condition, where the hydrothermal operating condition comprises a temperature greater than about 374° C. and a pressure greater than about 25 bar as described above.

As described herein, an inner surface includes any surface within the reactor that comes in contact with the materials comprising the feed stream during hydrothermal operation.

According to embodiments, the reactor chamber has an inner surface comprising a material, e.g., a metal, which corrodes when in contact with a corrosive agent, e.g., a phosphorus-containing phase formed at the hydrothermal operating condition. The material can be any of the materials of the walls of the reactor discussed above with respect to FIG. 3. In particular embodiments, the material includes titanium.

It will be appreciated that the hydrothermal operating condition can depend on the reactants present in addition to water. According to various embodiments, the hydrothermal operating condition can have a temperature range of about 374° C. to about 800° C., about 500° C. to about 800° C. or about 600° C. to about 750° C., among other temperature ranges. According to various embodiments, the hydrothermal operating condition can have a pressure range of about 25 bar to about 350 bar, about 100 bar to about 300 bar or about 150 bar to about 250 bar, among other pressure ranges.

The method additionally comprises introducing to the hydrothermal reactor a feed stream comprising the feed material, where the feed material comprises a corrosive agent that is corrosive to the inner surface of the hydrothermal reactor at the hydrothermal operating condition. The feed stream can include, e.g., a hetero-atom-containing compound, where the hetero-atom can be one or more of Cl, P, F and/or S, and where the hetero-atom, e.g., P, can be the corrosive agent.

According to embodiments, the method uses the reactor 322 (FIG. 3) configured to receive the feed, which can include heteroatom(s), according to embodiments. In some embodiments, the feed is an aqueous organic waste containing about 1 wt. % to about 50 wt. % organic matter, about 2 wt. % to about 30 wt. % organic matter or 5 wt. % to 20 wt. % organic matter, according to embodiments. It will be appreciated that, from a commercial standpoint, the targeted concentration ranges can represent relatively dilute concentrations of organic matter for which incineration is cost-ineffective, such that SCWO can be cost-competitive over incineration. That is, these concentrations may represent concentration ranges that are too dilute for incineration to handle efficiently but too concentrated for practical application of an adsorption-based process such as activated carbon treatment, such that the method according to embodiments can be relatively cost-effective.

According to various embodiments, the organic waste comprises one or more compounds having one or more of Cl, P, F and/or S. For example, the organic waste can include one or more of: dichlorodiphenyltrichloroethane (DDT), decachlorobiphenyl, pentachlorophenol, polychlorotrifluoroethylene, ammonium chloride, 1,2-dichlorobenzene, polyvinyl chloride (PVC), 1,4-dichlorobenzene, ammonium perchlorate, 2,4-dichlorobenzene, 1,2-dichloroethylene lactic acid, ammonium sulfate, 2,4-dichlorophenol, 2,4-dichlorophenoxyacetic acid, dimethyl methyl phosphonate (DMMP), tetrachloroethylene, methylene chloride, carbon tetrachloride, thiodiglycol, methylphosphonic acid (MPA), 2-chlorobiphenyl, 3-chlorobiphenyl ethylene glycol naphthol trichloroacetic acid, 4-chlorobiphenyl, 1,1,1-trichloroethane, chloroform, 1,1,2-trichloroethane, 4-chloro-3-methylphenol, trichloroethylene, 2-chlorophenol, 2,4,6-trichlorophenol, 4-chlorophenol, o-chlorotoluene heaxchlorobenzene, VX (o-ethyl-S [2-(diisopropylamino)-ethyl]-methylphosphonothiolate) and hexachlorocyclopentadiene, to name a few.

According to various embodiments, the organic waste can be in any phase (e.g., solid or liquid) that can be dissolved or slurried into a form that can be introduced into the reactor 322 (FIG. 3) under pressure.

The method additionally includes introducing to the hydrothermal reactor 322 (FIG. 3) a corrosion inhibitor in an amount that is effective to at least partially react with the corrosive agent to form an insoluble inorganic compound at the hydrothermal operating condition.

The corrosion inhibitor can be an inorganic and/or an organic compound which includes an alkaline earth metal in the form of an ion selected from magnesium (Mg) ion and calcium (Ca) ion. The corrosion inhibitor can be provided in any suitable form, such as part of an organic or inorganic compound containing the inhibiting ion.

In embodiments, the corrosion inhibitor includes compounds of Mg or Ca that are basic or salts of weak acids, e.g., $Mg(OH)_2$, $Ca(OH)_2$, $MgCO_3$, and/or $CaCO_3$, which can be particularly effective in neutralizing acids that may be corrosive to the inner surface of the hydrothermal reactor.

However, embodiments are not so limited and the corrosion inhibitor can include oxides, halides, and sulfates of alkaline earth metal, since due to the higher stability of the phosphate salts described above, the original anions will be displaced by phosphate. For example, when the corrosion inhibitor includes Mg ion, the inhibiting ion can be provided in the form of one or more of MgO, $MgCl_2$ and $MgSO_4$, to name a few examples, all of which will form $Mg_3(PO_4)_2$. Likewise, when the corrosion inhibitor includes Ca ion, the inhibiting ion can be provided in the form of one or more of CaO, $CaCl_2$, and $CaSO_4$, to name a few examples, all of which will form $Ca_3(PO_4)_2$. The inhibiting ion can also be provided in the form of nitrates (e.g., $Mg(NO_3)_2$, $Ca(NO_3)_2$) or nitrites (e.g., $Mg(NO_2)_2$, $Ca(NO_2)_2$) of the alkaline earth ions.

In various embodiments, the method includes selectively reacting the corrosion-inhibitor with phosphorus in a phosphorus-containing phase, thereby precipitating in the reactor chamber a phosphorus-containing inorganic compound, according to embodiments. Selectively reacting can reduce the phosphorus available for corroding the reactor chamber such that a substantial amount of the phosphorus in the phosphorus-containing waste compound is prevented from corroding the inner surface, according to embodiments.

The corrosion of the inner surfaces, e.g., chamber walls, of a SCWO-based reactor can be caused by a variety of phosphorus-containing phases, including a supercritical phase of water having phosphorus-containing species dissolved or dispersed therein that may be present in reactor during the oxidation of the organic waste, as well as subcritical phases including corrosive compounds, such as acids or salts that may be present in the reactor during the oxidation of the organic waste. For example, when the corroding element is phosphorus and the material is titanium, corrosion is typically caused by vapor phase phosphoric acid ($H_3O_4$) or liquid phase sodium metaphosphate per Equation [1].

It will be appreciated that, while the method is particularly described in the context of P being the primary corrosive species, embodiments are not so limited, and can be applied to inhibit corrosion caused by other elements.

As discussed elsewhere and herein, by reacting the corrosion inhibitor, e.g., an alkaline earth ion, with phosphorus atoms or phosphorus-containing ions of the phosphorus-containing phase, corrosion-causing phosphorus can be minimized or prevented from reaching the surfaces, e.g., titanium atom-containing surfaces, of the reactor walls. However, as discussed elsewhere herein, the organic waste, in addition to containing phosphorus-containing waste compounds, can contain one or more additional heteroatoms (e.g., Cl, F and/or S). When the corrosion inhibitor, e.g., an alkaline earth compound, is introduced into the reactor in the presence of P as well as other heteroatoms of Cl, F and/or S, excessive amounts of salts can be formed, leading to clogging or plugging of the reactor. In particular, salts formed by the alkaline earth compound and other anions present, e.g., Cl, F and/or S can form "sticky" salts, which can adhere to various surfaces, including the walls of the reactor 322.

Recognizing this fact, according to various embodiments, the corrosion inhibitor is selectively reacted with phosphorus in the phosphorus-containing phase under the oxidation temperature and pressure such that a substantial amount of the phosphorus in the phosphorus-containing waste compound is neutralized or prevented from corroding the inner surface of the reactor. However, because the corrosion inhibitor selectively reacts with phosphorus to form a phosphorus-containing solid, e.g., $Ca_3(PO_4)_2$ or $Mg_3(PO_4)_2$, other heteroatoms (S, Cl, and/or F) can still cause excessive precipitation of solid compounds, e.g., salts, that cause plugging or clogging. To prevent such excessive precipitation of solids having heteroatoms other than P, a flowable base melt is formed, according to embodiments.

In particular, according to embodiments, excessive precipitation of sticky salts of the alkaline earth element and Cl, F and/or S is minimized or prevented, by forming a salt melt, e.g., an alkali salt melt having a having a eutectic composition. Thus, the method according to embodiments additionally includes introducing to the hydrothermal reactor melt-forming agents in an amount effective to form a salt melt at the hydrothermal operation conditions, wherein the insoluble inorganic compound is dispersed in the salt melt. In embodiments, the melt-forming agents include alkali metal compounds, which can include one or more of lithium, sodium and potassium. The compound having the alkali metal can be any inorganic or organic compound containing the alkali metal. According to various embodiments, a flowable base melt is provided by a primary salt melt comprising a mixture of two or more of alkali metal fluoride, alkali metal chloride, and/or an alkali metal sulfate melt. For example, where the alkali metal is sodium, the base melt can be formed by a mixture of NaCl and $NaSO_4$.

If a feed contains or only contains anionic element(s) of a salt, e.g., Cl, adding a mixture of Na and K neutralizing agents would yield a low-melting salt mixture. In another example, if a feed contains or only contains cationic element(s) of a salt, e.g., Na, a mixture of hydrochloric and sulfuric acids could be added to attain a low-melting composition. In another example, if a feed material already contains a salt, e.g., NaCl, another salt, e.g., $Na_2SO_4$, could be added to attain a low-melting composition. In yet another example, if a feed material contains P as the only heteroatom, both NaCl and $Na_2SO_4$ salts could be added to produce a low-melting composition.

Without subscribing to any theory, the selective reaction between the corrosion-inhibitor and phosphorus in the phosphorus-containing phase can be correlated to a higher salt melting point and the associated higher salt stability. As a result, when the corrosion-inhibitor comprises calcium, calcium phosphate ($Ca_3(PO_4)_2$, whitlockite) may be formed in the reactor, which is thermodynamically more stable, e.g., has a more negative Gibbs free energy of formation, than calcium sulfate, calcium fluoride, calcium chloride, or calcium carbonate, and more stable than the sodium metaphosphate ($NaPO_3$) that may be formed as part of the method. Likewise, magnesium phosphate is similarly more thermodynamically stable than magnesium sulfate, magnesium chloride, or magnesium carbonate that may be formed as part of the method. Thus, alkaline earth metals, e.g., calcium and magnesium, have much stronger affinity for phosphorus than does sodium under the circumstances according to embodiments, such that they may react with phosphorus and thereby inhibit the tendency of phosphorus to corrosively attack metal (e.g., titanium) on the reactor surfaces. Thus, by effectively reacting the corrosion inhibitor with phosphorus, titanium corrosion can be reduced dramatically, or even nearly eliminated, according to embodiments. According to various embodiments, at least 50%, at least 70% or at least 90% of an initial amount of phosphorus in the organic compound is precipitated in the form of inorganic compound(s) comprising P and the corrosion inhibitor.

The method according to embodiments further includes, after introducing into the hydrothermal reactor the corrosion inhibitor and the melt-forming agent, operating the hydrothermal reactor at the hydrothermal operating condition for a period of time effective to treat the feed material, and removing at least a portion of the salt melt from the hydrothermal reactor. To effectively carry away the inorganic solid using the base salt melt without excessive salt build-up, the amount of the inorganic solid should not be excessively high, according to embodiments. According to embodiments, where the phosphorus-containing inorganic compound is primarily $Ca_3(PO_4)_2$ or $Mg_3(PO_4)_2$, the amount of phosphorus-containing inorganic compound does not exceed about 30 wt. %, about 20 wt. % or about 10 wt. % of the mixture of the phosphorus-containing inorganic compound and the alkali salt melt, such that adequate flowability is achieved, according to embodiments. Thus the mixture provides adequate flowability of the inorganic solids along with the primary salt melt, according to embodiments.

While the salt melt can be formed by addition of various elements as described above, it will be appreciated that, if the organic feed by itself is already of a composition sufficient to form a melt, further adjustment of composition may not be needed.

Thus, systems and methods for SCWO-based processing of heteroatom-containing feeds disclosed herein minimizes corrosion resulting from a heteroatom, e.g., phosphorus, by reacting or complexing with a corrosion inhibiting element, while at the same time minimizing process risk from excessive salt accumulation from other heteroatoms, e.g., Cl, S, and/or F. Advantageously, according to the method, by precipitating in the hydrothermal reactor a solid inorganic compound formed from the corrosive element and the corrosion inhibitor, the amount of corrosive element available for corrosion can be substantially reduced. For example, when the method is employed in various embodiments, the inner surfaces of the reactor do not corrode by more than 1 mil/hr., more than 0.5 mil/hr., or more than 0.1 mil/hr. In addition, when the method is employed, the rate of corrosion of the inner surface of the reactor does not exceed more than 10%, more than 25%, or more than 50% of the rate of corrosion observed without introducing the corrosion inhibitor to precipitate the inorganic compound.

In the above, apparatus, systems, and methods for SCWO processing of feed materials are described in connection with particular embodiments. It will be understood, however, that the principles and advantages of the embodiments can be used for any other systems, apparatus, or methods with a need for hydrothermal treatment of feed materials. In the foregoing, it will be appreciated that any feature of any one of the embodiments can be combined and/or substituted with any other feature of any other one of the embodiments. For example, the methods described herein are applicable to hydrothermal reactors having an inner surface that include materials other than titanium, such as for mitigating phosphorus corrosion of nickel-based alloys.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." Likewise, the word "connected", as generally used herein, refers to two or more elements that may be either directly connected, or connected by way of one or more intermediate elements. Additionally, the words "herein," "above," "below," "infra," "supra," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All suitable combinations and subcombinations of features of this disclosure are intended to fall within the scope of this disclosure.

What is claimed is:

1. A method of inhibiting corrosion in a hydrothermal system during hydrothermal treatment of a feed material, comprising:
   providing a hydrothermal reactor having an inner surface that is susceptible to corrosion at a hydrothermal operating condition, the hydrothermal operating condition comprising a temperature greater than about 374° C. and a pressure greater than about 25 bar;
   introducing to the hydrothermal reactor a feed stream comprising the feed material, the feed material comprising a corrosive agent that is corrosive to the inner surface of the hydrothermal reactor at the hydrothermal operating condition, the corrosive agent comprising phosphorus;
   introducing to the hydrothermal reactor a corrosion inhibitor that selectively reacts with the corrosive agent to form an insoluble inorganic compound at the hydrothermal operating condition;
   introducing to the hydrothermal reactor melt-forming constituents in an amount effective to form a salt melt at the hydrothermal operation condition, the salt melt comprising the insoluble inorganic compound;
   operating the hydrothermal reactor at the hydrothermal operating condition for a period of time effective to treat the feed material; and
   removing at least a portion of the salt melt from the hydrothermal reactor.

2. The method of claim 1, wherein an area of the inner surface that is in contact with the feed stream during the operating corrodes at a rate of less than 1 mil per hour during the operating of the hydrothermal reactor at the hydrothermal operating condition.

3. The method of claim 1, wherein the corrosion inhibitor comprises magnesium (Mg) or calcium (Ca).

4. The method of claim 1, wherein the salt melt comprises a mixture of sodium salts.

5. The method of claim 4, wherein the sodium salt comprises two or more anionic elements selected from the group consisting of Cl, S, F and P.

6. The method of claim 1, wherein the inner surface of the hydrothermal reactor chamber comprises titanium (Ti).

7. The method of claim 1, wherein the feed material is an organic waste that contains an organophosphorus compound.

8. The method of claim 7, wherein the corrosive agent comprises a phosphorus-containing acid or salt formed by reaction of the organophosphorus compound at the hydrothermal operating condition.

9. A method of oxidizing a feed material, comprising:
providing a feed stream comprising water, a corrosion inhibitor, a waste feed comprising a phosphorus compound and melt-forming agents that form an alkali metal salt melt at a temperature greater than about 374° C. and a pressure exceeding about 25 bar;
introducing the feed stream and an oxidant into a reactor chamber and oxidizing the feed stream at the temperature and pressure, wherein the reactor chamber has an inner surface comprising a material which is susceptible to corrosion when in contact with a phosphorus-containing corrosive agent formed from the phosphorus compound in the reactor chamber;
selectively reacting the corrosion inhibitor with the phosphorus-containing corrosive agent, thereby precipitating in the reactor chamber a solid phosphorus-containing inorganic compound;
forming in the reactor chamber an alkali salt melt; and
flowing away from the reactor chamber a mixture comprising the solid phosphorus-containing inorganic compound and the alkali salt melt.

10. The method of claim 9, wherein the corrosion inhibitor is a compound comprising an alkaline earth metal, and wherein selectively reacting the corrosion inhibitor with the phosphorus-containing corrosive agent comprises reacting the alkaline earth metal with the phosphorus-containing corrosive agent in the reactor chamber.

11. The method of claim 10, wherein precipitating the solid phosphorus-containing inorganic compound comprises precipitating an alkaline earth metal phosphate.

12. The method of claim 10, wherein the alkaline earth metal is magnesium (Mg) or calcium (Ca).

13. The method of claim 12, wherein providing the corrosion inhibitor comprises providing a compound selected from the group consisting of magnesium nitrate $(Mg(NO_3)_2$ calcium nitrate $(Ca(NO_3)_2)$, magnesium nitrite $(Mg(NO_2)_2)$ and calcium nitrite $(Ca(NO_2)_2)$.

14. The method of claim 9, wherein the alkali salt melt is a melt of sodium (Na) salts.

15. The method of claim 14, wherein the sodium salt melt comprises two or more anion-forming elements selected from the group consisting of Cl, S, and F, and wherein selectively reacting the corrosion inhibitor with the phosphorus-containing corrosive agent includes selectively reacting against one or more of anion-forming elements.

16. The method of claim 9, wherein the inner surface of the reactor chamber comprises titanium (Ti).

17. A method of inhibiting corrosion in a supercritical water oxidation (SCWO) system during oxidation of an organic waste material at a SCWO operating condition, comprising:
providing a SCWO reactor having a titanium inner surface;
introducing to the SCWO reactor a feed stream comprising the organic waste material, the organic waste material comprising an organophosphorus compound;
introducing to the SCWO reactor an alkaline earth compound that selectively reacts with phosphorus of the organophosphorus compound to form an insoluble phosphorus-containing compound under SCWO conditions, the alkaline earth compound comprising at least one of magnesium and calcium;
introducing to the hydrothermal reactor sodium-containing salt constituents in an amount effective to form a salt melt at the hydrothermal operation condition, the salt melt comprising the insoluble phosphorus-containing compound;
operating the SCWO reactor at the SCWO operating condition for a residence time effective to treat the organic waste material and thereby release phosphorus; and
removing at least a portion of the salt melt from the SCWO reactor.

18. The method of claim 17, wherein the alkaline earth compound is selected from the group consisting of calcium hydroxide, calcium carbonate, calcium chloride, calcium sulfate, calcium oxide, magnesium hydroxide, magnesium carbonate, magnesium chloride, magnesium sulfate, magnesium oxide, and mixtures thereof.

19. The method of claim 17, wherein the sodium-containing salt constituents include one or both of sodium chloride and sodium sulfate.

* * * * *

UNITED STATES PATENT AND TRADEMARK OFFICE
CERTIFICATE OF CORRECTION

PATENT NO. : 10,688,464 B2  
APPLICATION NO. : 15/613616  
DATED : June 23, 2020  
INVENTOR(S) : Glenn Thomas Hong Page 1 of 1

It is certified that error appears in the above-identified patent and that said Letters Patent is hereby corrected as shown below:

In the Specification

In Column 11, Line 3, delete "$(PO_4)_2$," and insert --$(PO_4)_2$),--.

In Column 12, Line 27, delete "heaxchlorobenzene," and insert --hexachlorobenzene,--.

In Column 13, Line 18, delete "$(H_3O_4)$" and insert --$(H_3PO_4)$--.

In the Claims

In Column 17, Line 41 (Approx.), Claim 13, delete "$(Mg(NO_3)_2$" and insert --$(Mg(NO_3)_2)$,--.

Signed and Sealed this  
Tenth Day of November, 2020

Andrei Iancu  
*Director of the United States Patent and Trademark Office*